United States Patent

Limberg et al.

[15] 3,641,361

[45] Feb. 8, 1972

[54] PROTECTION CIRCUIT

[72] Inventors: Allen Leroy Limberg, Somerville; Steven Alan Steckler, Clark, both of N.J.

[73] Assignee: RCA Corporation

[22] Filed: Dec. 3, 1970

[21] Appl. No.: 94,841

[52] U.S. Cl. ............................307/202, 307/237, 178/7.3 R

[51] Int. Cl. ..........................................H02k 7/20, H03k 5/08

[58] Field of Search ..........................................307/202, 237

[56] References Cited

UNITED STATES PATENTS

| | | | |
|---|---|---|---|
| 3,122,697 | 2/1964 | Kauders | 307/202 |
| 3,079,543 | 2/1963 | Decker | 307/202 |
| 3,215,851 | 11/1965 | Warnock | 307/237 |
| 3,482,134 | 12/1969 | Mann | 307/235 |
| 3,073,969 | 1/1963 | Skillen | 307/237 |
| 3,518,449 | 6/1970 | Chung | 307/237 |

*Primary Examiner*—Donald D. Forrer
*Assistant Examiner*—Harold A. Dixon
*Attorney*—Eugene M. Whitacre

[57] ABSTRACT

A protection circuit limits the collector current of a transistor employed as a clamp-to-ground stage in the event the collector terminal of the transistor is accidentally short circuited during conduction to a low-impedance voltage source. The protection circuit includes a transistor which has its base-emitter junction coupled across the base-emitter junction of the clamping transistor and has a collector resistor chosen to provide a saturation current for the protection transistor which holds the base-emitter junction voltage at a level which limits the collector current of the clamping transistor.

11 Claims, 1 Drawing Figure

PATENTED FEB 8 1972
3,641,361
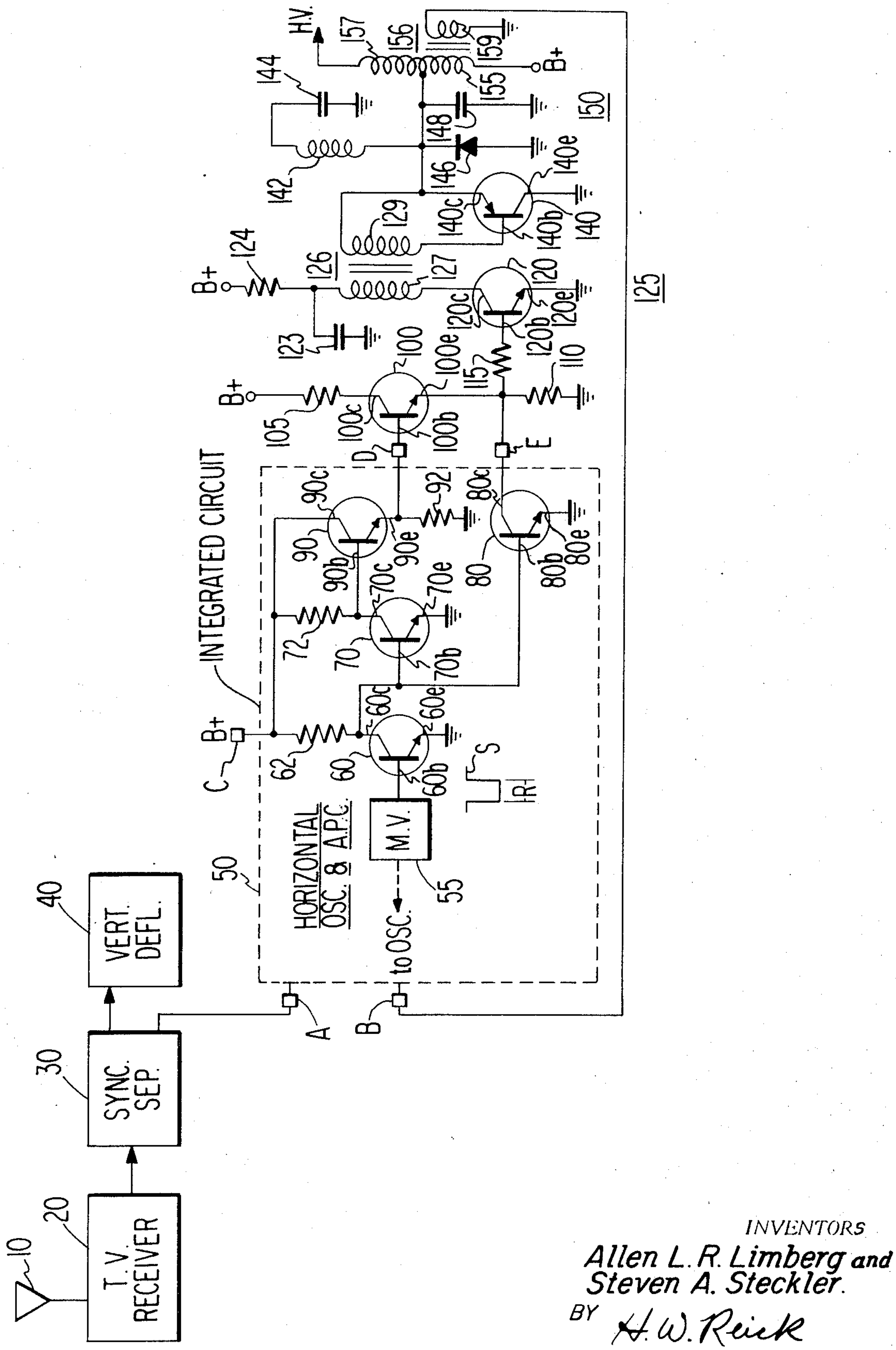
INVENTORS
Allen L. R. Limberg and
Steven A. Steckler.
BY H. W. Reick
ATTORNEY

PROTECTION CIRCUIT

The present invention relates to a protection circuit which can be employed to protect an output transistor operated as a clamp-to-ground stage.

A transistor is often employed as a clamp-to-ground means. For this function its emitter is directly coupled to ground and its collector is coupled to the circuit location desired to be clamped to ground. Application of sufficient current to the base electrode of the transistor will cause it to saturate, clamping its collector electrode to ground. During the clamping mode of operation (i.e., when the transistor is conductive), its collector terminal may be accidentally short-circuited to a low impedance voltage source. This can happen, for example, when the electronic circuitry is serviced. Such a short circuit may, without protection of the output transistor, cause the output transistor to draw excessive current, overdissipate and thereby destroy the device. The common practice of inserting a current limiting resistor in series with the collector of the output transistor is undesirable, since it interferes with good clamping action. When the clamping transistor is part of an integrated circuit, the entire integrated circuit structure must be replaced.

Circuits embodying the present invention include an output transistor having a grounded emitter and a collector coupled directly to a circuit point which is to be clamped to ground by the conduction of the output transistor. A protection circuit for the output transistor comprises a second transistor having a base-to-emitter junction coupled in parallel with the base-to-emitter junction of the output transistor and having a collector terminal coupled to an operating voltage source by means of a collector load resistor. The second transistor is thermally coupled to the output transistor and will in the event of a short circuit of the collector of the output transistor to a low impedance voltage source, saturate and maintain the base-to-emitter voltage of the output transistor at a predetermined level which will limit the current through the output transistor.

The sole FIGURE of the drawing is an electrical circuit diagram partially in block and schematic form of a television receiver including an integrated circuit having an output transistor employed as a clamp-to-ground stage and the protection circuit of the present invention.

In the FIGURE, an antenna 10 receives television signals and couples them to a television receiver 20 which includes, for example, a tuner, a mixer stage, IF stages, a video detector, an audio stage and a video output stage which couples video output signals to a control element of a kinescope to provide a video display of the received television signals. The circuits included within stage 20 are similar to the circuits of the television receiver described by RCA Television Service Data 1969, No. T-14, published by RCA Corporation, Indianapolis, Indiana. The receiver couples composite video and synchronizing signals to a synchronization separator stage 30 (shown as a separate block in the FIGURE but included in the television receiver) which separates the video signal from the synchronization signal components and separates the vertical synchronization components from the horizontal synchronization components. The vertical sync signals are then coupled to a vertical deflection stage 40 which includes a vertical oscillator and deflection output stage to develop the required vertical deflection current which is coupled to a vertical deflection yoke (not shown) associated with the kinescope display device of the television receiver.

The horizontal sync signals from the sync separator 30 are applied to a horizontal oscillator and automatic phase control circuit 50. Stage 50 may be an integrated circuit as indicated in the FIGURE by the dashed lines surrounding the circuit components and may include a phase comparator for detecting the timing relationship between the incoming horizontal sync pulses and flyback pulses from the horizontal output stage, and for developing a control signal to lock the frequency of a voltage controlled oscillator which is included in the stage 50, though not shown as such. Such a system is described in detail in a concurrently filed application Ser. No. 94,889, filed Dec. 3, 1970, entitled, "Automatic Frequency Controlled Oscillator System" by S. A. Steckler and assigned to the present assignee. The output of the voltage controlled oscillator may be coupled to a multivibrator circuit 55 (shown in block diagram form) which develops keying signals to drive a horizontal driver stage 125 and a horizontal output stage 150 of the receiver.

The output of the multivibrator 55 is coupled to a base terminal 60B of a transistor 60. An emitter terminal **60*e* of transistor 60 is coupled to ground, and a collector terminal 60*c* of transistor 60 is coupled to a source of operating potential (B+) through a resistor 62 by means of an external terminal C of the integrated circuit. The collector terminal 60*c* is further coupled to a base terminal 70*b* of transistor 70 and to a base terminal 80*b* of output transistor 80. An emitter terminal 70*e* of transistor 70 is coupled to ground, and a collector terminal 70*c* of transistor 70 is coupled to the source of operating B+ potential by means of a collector resistor 72. Collector terminal 70*c* is additionally coupled to a base terminal 90*b* of a transistor 90. A collector terminal 90*c* of transistor 90 is coupled to the B+ source of operating potential. An emitter terminal 90*e* of transistor 90 is coupled to ground by means of an emitter resistor 92 and further coupled to an output terminal D of the integrated circuit 50. A collector terminal 80*c* of transistor 80 is directly coupled to an additional output terminal E of the integrated circuit 50**.

An emitter-follower stage including a transistor 100 has a base terminal **100*b* coupled to terminal D of the integrated circuit chip and an emitter terminal 100*e* coupled to output terminal E of the integrated circuit. A collector terminal 100*c* of transistor 100 is coupled to the B+ source of operating potential by means of a resistor 105. An emitter resistor 110 couples the junction of emitter terminal 100*e* and output terminal E of the integrated circuit 50 to ground. The emitter terminal 100*e* of transistor 100 is coupled to a base terminal 120*b* of transistor 120 included in the horizontal driver stage 125 by means of a resistor 115. An emitter terminal 120*e* of transistor 120 is coupled to ground. A collector terminal 120*c* of transistor 120 is coupled to the source of operating potential by means of the series combination of a primary winding 127 of coupling transformer 126 and a resistor 124. A capacitor 123 is coupled from the junction of primary winding 127 and resistor 124 to ground. A secondary winding 129 of transformer 126 is coupled across the base-to-emitter junction of a horizontal output transistor 140 of horizontal output stage 150 by means of connections to a base terminal 140*b* and an emitter terminal 140*e* of transistor 140 as shown in the FIGURE. A collector terminal 140*c* of transistor 140 is coupled to ground. Input power for the horizontal output stage 150 is applied to transistor 140 by means of a primary winding 155 of horizontal output transformer 156 which is coupled between the emitter terminal 140*e* of transistor 140 and the B+ supply. The horizontal output stage 150 further includes a damper diode 146 and retrace capacitor 148 coupled in parallel relationship from emitter terminal 140*e* to ground. A horizontal deflection yoke 142 is coupled in series relationship to an S-shaping capacitor 144, the series combination also being coupled from emitter terminal 140*e* to ground. A secondary winding 157 of transistor 156 supplies high voltage pulses (indicated by H.V. in the FIGURE) which can be rectified and applied to the kinescope to supply the accelerating potential for the kinescope. The horizontal output transformer 156 further includes an auxiliary winding 159 for supplying keying pulses to the horizontal oscillator and APC stage 50 by means of terminal B of circuit 50**.

The clamp-to-ground stage 80 in circuit 50 may have general circuit applications. It is particularly useful in rapidly sweeping the stored carriers from the base region of transistor 120, when turning it and transistor 140 off to define the initiation of the retrace interval of each horizontal deflection cycle.

In operation, the multivibrator 55 in circuit 50 provides a negative-going pulse as shown by the waveform S adjacent and below multivibrator 55. As this signal is applied to the base terminal 60*b* of transistor 60, transistor 60 is rendered nonconductive, thereby providing a positive-going signal at the collector terminal 60*c* of transistor 60. The positive-going signal at the collector terminal 60*c* of transistor 60 is applied to the base terminal 80*b* of transistor 80 and the base terminal 70*b* of transistor 70. During normal operation, transistor 80 will saturate prior to transistor 70 and effectively couple output terminal E of circuit 50 to ground, thereby providing a low impedance current path for the base circuit of transistor 120. Transistor 70 will also be driven into saturation by the positive signal from the collector 60*c*, thereby providing a negative-going signal at collector terminal 70*c* of transistor 70. This signal which is applied to the base terminal 90*b* of transistor 90 will render transistor 90 nonconductive and the potential across emitter resistor 92 of transistor 90 goes to zero. This signal—which is applied to the base terminal 100*b* of transistor 100 be means of external terminal D—will render transistor 100 nonconductive during the retrace interval of each horizontal deflection cycle.

Transistor 80 is conductive during the horizontal retrace interval. If a low impedance voltage source is accidentally short-circuited to the collector electrode of transistor 80 while it is conductive, it will, if unprotected, draw excessive collector current. This results since transistor 80 is prevented by the low impedance of the short circuit from saturating at a safe current level and thereby limiting its own maximum collector current. The consequent overdissipation of the transistor will damage it. With the addition of protection transistor 70, however, the maximum collector current obtainable from transistor 80 will be limited to values preventing damage. This is accomplished in the following manner.

In the event of a short circuit, transistor 70 will saturate and its base-to-emitter voltage will be controlled by the magnitude of the collector load resistor 72 and the B+ supply voltage. This base-to-emitter voltage is, however, directly coupled across the base-to-emitter junction of transistor 80 and will also control its collector current level to a safe level. By selecting the value of collector resistor 72, the saturation current of transistor 70 can be selected to provide any predetermined voltage across the base-to-emitter junction of the saturated transistor 70. A maximum current level can be selected such that transistor 80 will not be damaged due to an accidental short circuit.

During the remaining portion of each deflection cycle (i.e., horizontal trace), the output signal from multivibrator 55 will swing positive, thereby causing transistor 60 to become conductive and transistors 70 and 80 to be nonconductive. As transistor 70 switches from its conductive to nonconductive state, the collector voltage at collector terminal 70*c* increases, thereby rendering transistor 90 conductive and providing a positive signal across emitter resistor 92. Transistor 100 will thereby be rendered conductive to develop a positive signal across its emitter resistor 110.

Since the base terminal 120*b* of driver transistor 120 is coupled to the emitter resistor 110 by means of resistor 115, the positive signal at the emitter terminal 100*e* of transistor 100 will render driver transistor 120 conductive which in turn applies a signal to the base terminal 140*b* of transistor 140 in the horizontal output stage by means of coupling transformer 126. This signal applied to the base of transistor 140 initiates the beginning of the horizontal trace interval. The horizontal output stage 150 is conventional in design, and its operation is not described here.

It is noted that the base-to-emitter junction area of the output transistor 80 can be made proportionally larger than the base-to-emitter junction area of protection transistor 70. This will permit the transistor 80 collector current to be larger than that of transistor 70 in the same proportion. Substantial current may be drawn through transistor 80 without requiring substantial current to be drawn through transistor 70, thereby reducing the contribution of the protection stage 70 to the total dissipation of the integrated circuit. In one embodiment, for example, the base-to-emitter junction area of transistor 80 was three times the base-to-emitter junction area of transistor 70. In this embodiment, the B+ supply was +10.5 direct volts and resistor 72 was a 3.9 KΩ resistor.

What is claimed is:

1. A protection circuit for limiting the collector current of a clamping transistor having base, collector and emitter terminals and employed as a clamp-to-a reference potential stage subject to destruction by the accidental shorting of said collector terminal to a low impedance voltage source, said protection circuit comprising:

a protection transistor having base, collector and emitter terminals and having said base terminal coupled to a base terminal on said clamping transistor and said emitter terminal coupled to the emitter terminal of said clamping transistor, said protection transistor being thermally coupled to said clamping transistor, a source of operating potential, and a collector resistor coupled from the collector terminal of said protection transistor to said source of operating potential to limit both the saturation current flowing through said protection transistor in response to the application of an input signal between its base and emitter terminals and the resulting base-emitter voltage of said protection transistor, so as to limit the collector current flowing in said clamping transistor upon said signal application and the coincident occurrence of a short circuit to said collector terminal of said clamping transistor.

2. A circuit as defined in claim 1 wherein said clamping and protection transistors are included in a common monolithic semiconductor circuit and wherein said collector terminal of said clamping transistor is an external terminal of said monolithic semiconductor circuit.

3. A circuit as defined in claim 2 wherein said clamping and protection transistors are of the same conductivity type.

4. A circuit as defined in claim 1 wherein said clamping transistor has said collector terminal coupled to a driver transistor of a horizontal deflection system of a television receiver, said driver transistor responsive to the conduction of said clamping transistor in response to signals applied between said base and emitter terminals of said clamping transistor to initiate a retrace portion of each horizontal deflection cycle.

5. In an integrated circuit having an output transistor employed as a clamp-to-a reference potential stage, said output transistor having an emitter terminal coupled to ground and a collector terminal coupled directly to an output terminal on said integrated circuit thereby subjecting said clamping transistor to damage due to excessive collector current in the event said output terminal is accidentally shorted to a low impedance voltage source, a protection circuit to limit the collector current of said output transistor in the event of said short circuit, said protection circuit comprising:

a transistor on said integrated circuit, said transistor having base, collector and emitter terminals, said base terminal coupled directly to said base terminal of said output transistor, said emitter terminal directly coupled to said emitter terminal of said output transistor, and said collector terminal coupled to a source of operating potential by means of a collector resistor selected to limit the saturation current of said transistor to a value such that the base-emitter voltage of said transistor will control the base-emitter voltage of said output transistor to limit the current through said output transistor in the event of said short circuit.

6. A protection circuit as defined in claim 5 wherein said transistor is of the same conductivity type as said output transistor.

7. A circuit as defined in claim 6 wherein said base-emitter junction area of said transistor is substantially smaller than the base-emitter junction area of said output transistor.

8. An output circuit driven by a source of keying pulses having first and second voltage levels, said output circuit comprising:

a first transistor having base, collector and emitter terminals, said emitter terminal coupled directly to ground, thereby allowing said transistor to provide a low impedance current path from said collector terminal to ground during its conduction, a source of operating potential, a second transistor having base, collector and emitter terminals and thermally coupled to said first transistor, said base-emitter junction of said second transistor coupled in parallel to the base-emitter junction of said first transistor, said second transistor having a collector terminal coupled to said source of operating potential by means of a collector resistor, a third transistor having a base terminal coupled to said collector terminal of said second transistor, a collector terminal coupled to said source of operating potential, and an emitter terminal coupled to ground by means of an emitter resistor wherein said third transistor is responsive to signals from said collector terminal of said second transistor in response to the application of first level signals to said base terminal of said second transistor to provide an output signal across said emitter resistor of said third transistor and wherein said first and second transistors are responsive to said second voltage level keying pulses applied to their respective base terminals from said source of keying pulses to be rendered conductive.

9. A circuit as defined in claim 8 wherein said collector resistor of said second transistor has a value which limits the saturation current of said second transistor such that the base-emitter voltage is at a level which will limit the maximum collector current flowing in said first transistor in the event said collector terminal of said first transistor is short circuited to a low impedance voltage source.

10. A circuit as defined in claim 9 wherein said first, second and third transistors are fabricated in an integrated circuit and wherein said collector terminal of said third transistor is directly coupled to an output terminal of said integrated circuit.

11. A circuit as defined in claim 10 wherein said output terminal of said integrated circuit is coupled to a driver transistor of a horizontal deflection system of a television receiver which is responsive to the conduction of said first transistor to initiate a retrace portion of each horizontal deflection cycle.

* * * * *